United States Patent
Torres et al.

(10) Patent No.: US 9,832,276 B2
(45) Date of Patent: Nov. 28, 2017

(54) DYNAMIC DISABLING OF MULTI-STEP TRANSPORT LAYER HANDSHAKE SPOOFING IN PERFORMANCE ENHANCING PROXIES (PEPS) IN BROADBAND NETWORKS

(71) Applicant: Hughes Network Systems, LLC, Germantown, MD (US)

(72) Inventors: Robert Torres, New Market, MD (US); Nagesh Javali, Germantown, MD (US); John Border, Adamstown, MD (US); Venkat Ganesan, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 389 days.

(21) Appl. No.: 14/754,669

(22) Filed: Jun. 29, 2015

(65) Prior Publication Data

US 2015/0381752 A1    Dec. 31, 2015

Related U.S. Application Data

(60) Provisional application No. 62/018,552, filed on Jun. 28, 2014.

(51) Int. Cl.
*G06F 15/16* (2006.01)
*H04L 29/08* (2006.01)

(52) U.S. Cl.
CPC ............ *H04L 67/28* (2013.01); *H04L 67/141* (2013.01); *H04L 67/2861* (2013.01); *H04L 69/326* (2013.01)

(58) Field of Classification Search
CPC ... H04L 67/28; H04L 67/141; H04L 67/2861; H04L 69/326

(Continued)

(56) References Cited

U.S. PATENT DOCUMENTS 6,061,341 A * 5/2000 Andersson .......... H04W 76/022
370/328
6,185,520 B1 * 2/2001 Brown ................ G06F 13/4022
703/24

(Continued)

OTHER PUBLICATIONS

Border, J. et al. "Performance Enhancing Proxies Intended to Mitigate Link-Related Degradations," RFC 3135, Jun. 2001.*

(Continued)

*Primary Examiner* — Melvin H Pollack
(74) *Attorney, Agent, or Firm* — Potomac Technology Law, LLC

(57) ABSTRACT

An approach for selective dynamic disabling of transport layer handshake spoofing is provided. A local proxy node of a communications network receives request message from a respective local host for establishing a network connection with a remote host. A destination address for the network connection is determined. It is determined whether the destination address is included in a handshake spoofing bypass list. If it is determined that the destination address is included in the spoofing bypass list, a corresponding unspoofed connection request message is transmitted to a remote proxy node associated with the remote host, in accordance with a respective handshaking protocol for the connection establishment. If it is determined that the destination address is not included in the spoofing bypass list, a corresponding spoofed connection request message is transmitted to the remote proxy node, in accordance with a respective handshake spoofing protocol for the connection establishment.

8 Claims, 5 Drawing Sheets

(58) Field of Classification Search
USPC .......................................................... 709/228
See application file for complete search history.

(56) References Cited

U.S. PATENT DOCUMENTS

| | | | | |
|---|---|---|---|---|
| 6,278,705 | B1* | 8/2001 | Chau | H04L 12/2856 370/338 |
| 7,082,535 | B1* | 7/2006 | Norman | H04L 63/08 709/225 |
| 7,552,234 | B2* | 6/2009 | Thubert | H04W 8/082 709/227 |
| 7,631,182 | B1* | 12/2009 | Droux | H04L 63/06 713/151 |
| 7,925,693 | B2* | 4/2011 | Swander | H04L 29/12481 709/203 |
| 8,006,059 | B1* | 8/2011 | Clayton-Luce | G06F 3/0605 709/226 |
| 8,059,680 | B2* | 11/2011 | Minami | H04L 12/2602 370/469 |
| 8,238,241 | B2* | 8/2012 | Samuels | H04L 41/00 370/230.1 |
| 8,305,896 | B2* | 11/2012 | Wood | H04L 47/10 370/230 |
| 8,326,981 | B2* | 12/2012 | Tock | G06F 21/33 709/224 |
| 8,346,947 | B2* | 1/2013 | Ajero | H04L 12/2801 370/352 |
| 8,438,086 | B2* | 5/2013 | Rosko | G06F 21/41 705/35 |
| 8,918,871 | B1* | 12/2014 | Yoon | H04L 63/10 709/223 |
| 8,966,011 | B2* | 2/2015 | Friedrich | H04L 29/12066 709/203 |
| 9,397,939 | B2* | 7/2016 | Kashyap | H04L 45/74 |
| 9,414,248 | B2* | 8/2016 | Kovvali | H04W 24/08 |
| 9,438,494 | B2* | 9/2016 | Samuell | H04L 43/0811 |
| 9,537,611 | B2* | 1/2017 | Zhovnirnovsky | H04L 69/16 |
| 9,538,576 | B2* | 1/2017 | Rasanen | H04L 12/14 |
| 9,621,607 | B2* | 4/2017 | Payette | H04L 67/141 |
| 9,674,731 | B2* | 6/2017 | Raleigh | H04W 28/0289 |
| 9,756,019 | B2* | 9/2017 | Warrick | H04L 63/0281 |
| 2002/0133596 | A1 | 9/2002 | Border et al. | |
| 2003/0172264 | A1 | 9/2003 | Dillon | |
| 2005/0044242 | A1 | 2/2005 | Stevens et al. | |
| 2008/0317002 | A1* | 12/2008 | Boppana | H04L 69/32 370/352 |
| 2012/0023330 | A1* | 1/2012 | Fink | H04L 9/0841 713/161 |
| 2015/0296418 | A1* | 10/2015 | Szilagyi | H04W 36/0016 370/331 |
| 2015/0310682 | A1* | 10/2015 | Arora | G07C 9/00166 340/5.7 |
| 2016/0234092 | A1* | 8/2016 | Avery | H04L 43/16 |
| 2017/0126741 | A1* | 5/2017 | Lang | H04L 63/20 |
| 2017/0244528 | A1* | 8/2017 | Gage | H04L 5/0053 |

OTHER PUBLICATIONS

Balakrishnan, H. et al. "TCP Performance Implications of Network Path Asymmetry," RFC 3449, Dec. 2002.*
US Patent Office, "International Search Report and Written Opinion", PCT/US2015/038398, dated Sep. 29, 2015.

* cited by examiner

|   | OSI MODEL | | TCP/IP |   |
|---|---|---|---|---|
| 1 | APPLICATION LAYER | | APPLICATION LAYER (e.g., DNS, HTTP, HTTPS, FTP, SNMP, DHCP) | 1 |
| 2 | PRESENTATION LAYER | | | |
| 3 | SESSION LAYER | | | |
| 4 | TRANSPORT LAYER | | TRANSPORT LAYER (e.g., TCP, UDP, SCTP) | 2 |
| 5 | NETWORK LAYER | | INTERNET LAYER (e.g., ICMP, IGMP) | 3 |
| 6 | DATA LINK LAYER | MAC | NETWORK ACCESS LAYER | 4 |
|   |   | LLC | | |
| 7 | PHYSICAL LAYER | | | |

FIG. 1
(PRIOR ART)

DYNAMIC DISABLING OF MULTI-STEP TRANSPORT LAYER HANDSHAKE SPOOFING IN PERFORMANCE ENHANCING PROXIES (PEPS) IN BROADBAND NETWORKS

RELATED APPLICATIONS

This application claims the benefit under 35 U.S.C. §119 (e) of the filing date of U.S. Provisional Patent Application Ser. No. 62/018,552 (filed Jun. 28, 2014), the entirety of which is incorporated herein by reference.

BACKGROUND

The entrenchment of data networking into the routines of modern society, as evidenced by the prevalence of the Internet, particularly the World Wide Web, has placed ever-growing demands on service providers to continually improve network performance. To meet this challenge, service providers have invested heavily in upgrading their networks to increase system capacity (i.e., bandwidth). In many circumstances, such upgrades may not be feasible economically or the physical constraints of the communication system does not permit simply "upgrading." Accordingly, service providers have also invested in developing techniques to optimize the performance of their networks.

The Open Systems Interconnection model (OSI) is a conceptual model that characterizes and standardizes the internal functions of a communications system by partitioning network communications into abstraction layers. With reference to FIG. 1, the OSI model layers are the physical layer, the data link layer, the network layer, the transport layer, the session layer, the presentation layer and the application layer. The physical layer defines the physical specifications of the data connection of a communications session, and defines the protocol required to establish and terminate a connection over that communication session. The data link layer provides for reliable link between two directly connected nodes over a communications connection or session. The data link layer is divided into two sub layers, the media access control (MAC) layer, responsible for controlling how nodes of the network are permitted to access data and to transmit the data, and logical link control (LLC) layer, for controlling error checking and packet synchronization. More specifically, the MAC sub-layer determines the physical addressing for the network nodes or hosts, and the LLC sub-layer is responsible for synchronizing frames, error checking, and flow control. The network layer provides for functional and procedural means for transferring variable length data sequences or datagrams from one node of the network to another. For example, the network layer provides for management of logical addressing within data packets and the delivery of those packets to the correct destination. The transport layer provides the functional and procedural means for transferring data packets from a source network node or host to a destination network node or host, including quality of service functions (e.g., the reliability of a given link via management of flow control and error control). The session layer controls data transmission for a given dialogue between network nodes or hosts over network links, such as establishing, management and termination of connections between local and remote network hosts for a given application session. The presentation layer establishes context between entities of the application layer whereby such entities may use different syntax and semantics with the presentation layer transforming such syntax and semantics for the receiving application. The application layer is the top layer of the OSI model, and interacts with applications that utilize the underlying network communications.

With respect to the Internet, Transmission Control Protocol/Internet Protocol (TCP/IP) comprises the core protocols for communications over the Internet. TCP provides for reliable, ordered and error-checked delivery of data octets between applications operating on network nodes or hosts of the Internet. IP comprises the principal communications protocol of the network or Internet layer, which is responsible for relaying datagrams across network boundaries (the routing functions that enable internetworking across the Internet). The TCP/IP model is partitioned into four abstraction layers, which are illustrated with respect to the seven OSI model layers in FIG. 1. The link layer (or the network access or interface layer) defines details of how data is physically sent through the network, including how bits are electrically or optically signaled by hardware devices that interface directly with a network medium (e.g., coaxial cable, optical fiber, or twisted pair copper wire). The link layer includes device drivers of the operating system and any corresponding network interface cards, which, together, handle hardware details of physically interfacing with the transmission media being utilized for the network communications. The network layer (also referred to as the Internet layer) handles the movement of packets around the network. The Internet layer provides for the formatting of data into packets known as IP datagrams, which contain source and destination address (logical address or IP address) information that is used to forward the datagrams between hosts and across networks. Also, routing of the data packets takes place at the network or Internet layer. Within the TCP/IP protocol, the Internet control message protocol (ICMP), and the Internet group management protocol (IGMP) may provide the network layer in the TCP/IP protocol suite. The transport layer provides for the flow of data between two network nodes or hosts, permitting such devices to carry on a conversation. The transport layer also defines the level of service and status of the connection when transporting data. The main protocols included at Transport layer are Transmission Control Protocol (TCP) and User Datagram Protocol (UDP). The application layer defines the TCP/IP application protocols and how host programs interface with the transport layer services for communications over the network. For example, the application layer includes all the higher-level protocols, such as the Domain Name System (DNS) Protocol, Hypertext Transfer Protocol (HTTP), File Transfer Protocol (FTP), Simple Network Management Protocol (SNMP), Dynamic Host Configuration Protocol (DHCP), etc.

TCP/IP provides reliable, in-sequence delivery of data between two IP hosts. The IP hosts set up a TCP connection, using a conventional TCP three-way handshake and then transfer data using a window-based protocol, where successfully received data packets are acknowledged by the receiving entity (hence, a reliable transmission protocol, as the transmitting host is notified of successfully received data packets and can thereby retransmit packets that are not acknowledged within a timeout period). FIG. 2 illustrates a ladder diagram depicting the three-way handshake process for establishing a TCP/IP connection over an Internet Protocol (IP) based network. Host A first sends a TCP synchronize (SYN) message/packet to Host B, and Host B responds with a synchronize-acknowledgement (SYN-ACK) message/packet. When Host A receives the SYN-ACK from Host b, Host A then sends back an acknowledge (ACK) message/packet, which completes the set-up of the respective TCP socket connection. SYN and ACK messages are indicated by setting either a SYN bit or an ACK bit in the TCP header, respectively, and the SYN-ACK message has both the SYN and the ACK bits set in the TCP header. When the communication between the two hosts ends, another 3-way communication is performed to tear down the TCP socket connection. This setup and teardown of a TCP socket connection reflects part of the basis for classifying TCP as a reliable protocol. TCP also acknowledges that data is successfully received and guarantees the data is reassembled in the correct order.

A Performance Enhancing Proxy (PEP) may be employed to improve the performance of Internet protocols on network paths where native performance suffers due to characteristics (such as latency of a satellite network) of a link or sub-network on the path. Further, in many Internet and intranet applications that employ TCP as the transport layer protocol, the link characteristics of the environment limit the performance of TCP and other higher layer protocols. In such cases, PEP process may be employed at the transport layer (a Transport Layer PEP), where such Transport Layer PEPs typically let the application protocol operate end-to-end without modifying the application protocol in any way (e.g., a PEP implementation that interacts with TCP layer or a TCP PEP). For example, in an environment with a large bandwidth-delay product (e.g., a satellite network), a TCP PEP may be used to alter the behavior of the TCP connection by generating "local acknowledgments," and thereby eliminate the multi-step handshake process by spoofing transport layer handshake messages to the client applications, in order to improve the throughput of the respective connection. As a further example, a Split Connection PEP implementation may be employed, which terminates the TCP connection received from an end system and establishes a corresponding TCP connection to the other end system. In a distributed PEP implementation, this is typically done to allow the use of a third connection between two PEPs optimized for the link. The Internet Engineering Task Force (IETF), Request for Comments (RFC) No. 3135, "Performance Enhancing Proxies Intended to Mitigate Link-Related Degradations" (June 2001), provides a more detailed description of TCP Spoofing and Split Connection PEP implementation, the entirety of which is incorporated herein by reference.

The Fast Fallback algorithm (also known as Happy Eyeballs) is one of a category of algorithms published by the IETF, which operates to make dual-stack applications (e.g., those that understand both IPv4 and IPv6, such as Web Browsers) more responsive to users. The Happy Eyeballs algorithm is designed to address a distinct problem that many IPv6 networks pose. When IPv6 connectivity is impaired, today's IPv6-capable applications (e.g., web browsers, email clients, instant messaging clients) incur many seconds of delay before falling back to IPv4. More specifically, the client first obtains the IPv4 and IPv6 records for the server, and then attempts to connect using IPv6 to the target If the IPv6 path fails, several seconds of time are consumed before the client falls-back to IPv4. Such delays significantly impact the overall application operation, and thereby impose a significant adverse effect on the user experience.

The Happy Eyeballs algorithm addresses this problem by determining which transport would be better used for a particular connection by trying them both in parallel. For example, the client sends two TCP SYNs at the same time over both IPv4 and IPv6. Then, if the IPv6 path fails, the IPv4 connection establishment is already running in parallel, and thus eliminates any long delay in falling-back to IPv4. After performing this procedure, the client learns whether connections to the host IPv6 or IPv4 address were successful, and caches the information regarding the outcome of each connection attempt for later reference so as to avoid burdening the network with subsequent attempts. The Happy Eyeballs algorithm may also be employed for choosing between transport protocols (e.g., TCP and SCTP). The IETF publication RFC No. 6555, "Happy Eyeballs: Success with Dual-Stack Hosts" (April 2012), provides a more detailed description of the Happy Eyeballs algorithm, the entirety of which is incorporated herein by reference.

As mentioned above, in PEP spoofing, the elimination of the multi-step handshake process involves spoofing of transport layer handshake messages to the client applications. In certain scenarios, however, when such PEP processes are employed, the transport layer handshake spoofing may interfere with host-based fallback mechanisms. Further, transport layer handshake spoofing may interfere with negotiation of transport layer connection characteristics, which may result in transport layer negotiation issues.

What is needed, therefore, is an approach for selective dynamic disabling of transport layer handshake spoofing only for connections where handshake spoofing would interfere with host-based fallback mechanisms and/or transport layer negotiations.

SOME EXEMPLARY EMBODIMENTS

The present invention advantageously addresses the foregoing requirements and needs, as well as others, by providing an approach for selective dynamic disabling of transport layer handshake spoofing for connections where handshake spoofing would interfere with host-based fallback mechanisms and/or transport layer negotiations. According to such an approach, the transport layer handshake spoofing would be selectively and dynamically disabled with respect to only those connections where handshake spoofing would interfere with host-based fallback mechanisms and/or transport layer negotiations. In an IPv4/IPv6 dual stack environment, the transport layer handshake spoofing would thereby remain active for all other connections where the handshake spoofing would not adversely affect the connection, and would thus preserve the PEP performance enhancements for such connections.

In accordance with a first example embodiment, a method is provided for selective dynamic disabling of transport layer handshake spoofing. A local proxy node of a communications network receives a request message from a respective local host for establishing a network connection with a remote host. A destination address for the network connection is determined. It is determined whether the destination address is included in a handshake spoofing bypass list. If it is determined that the destination address is included in the handshake spoofing bypass list, corresponding un-spoofed connection request message is transmitted to a remote proxy node associated with the remote host, in accordance with a respective handshaking protocol for the connection establishment. If it is determined that the destination address is not included in the handshake spoofing bypass list, a corresponding spoofed connection request message is transmitted to the remote proxy node associated with the remote host, in accordance with a respective handshake spoofing protocol for the connection establishment. By way of example, the connection comprises a transmission control protocol (TCP) connection, and the handshake spoofing protocol comprises eliminating multi-step handshake messaging over a network path between the local proxy node and the remote proxy node by generating local acknowledgments to spoof handshake messages to respective client applications.

According to a further embodiment of the method, when it is determined that the destination address is not included in the handshake spoofing bypass list, in addition to the transmission of the corresponding spoofed connection request message to the remote proxy node, a corresponding acknowledgment message is transmitted to the local host, in accordance with the respective handshake spoofing protocol for the connection establishment.

According to yet a further embodiment of the method, when it is determined that the destination address is not included in the handshake spoofing bypass list, it is determined whether an error message has been received from the remote proxy node. If it is determined that the error message has been received from the remote proxy node, the destination address is added to the handshake spoofing bypass list. If it is determined that the error message has not been received from the remote proxy node, the connection establishment is continued in accordance with the respective handshake spoofing protocol for the connection establishment.

In accordance with a second example embodiment, an apparatus is provided for selective dynamic disabling of transport layer handshake spoofing. The apparatus comprises at least one processor, and at least one memory including computer program code for one or more programs. The at least one memory and the computer program code configured to, with the at least one processor, cause the apparatus to perform at least the following functions: receive a request message from a respective local host for establishing a network connection with a remote host; determine a destination address for the network connection; determine whether the destination address is included in a handshake spoofing bypass list; and if it is determined that the destination address is included in the handshake spoofing bypass list, transmit a corresponding un-spoofed connection request message to a remote proxy node associated with the remote host, in accordance with a respective handshaking protocol for the connection establishment; and if it is determined that the destination address is not included in the handshake spoofing bypass list, transmit a corresponding spoofed connection request message to the remote proxy node associated with the remote host, in accordance with a respective handshake spoofing protocol for the connection establishment. By way of example, the connection comprises a transmission control protocol (TCP) connection, and the handshake spoofing protocol comprises eliminating multi-step handshake messaging over a network path between the local proxy node and the remote proxy node by generating local acknowledgments to spoof handshake messages to respective client applications.

According to a further embodiment of the apparatus, when it is determined that the destination address is not included in the handshake spoofing bypass list, in addition to the transmission of the corresponding spoofed connection request message to the remote proxy node, the apparatus is caused to transmit a corresponding acknowledgment message to the local host, in accordance with the respective handshake spoofing protocol for the connection establishment.

According to a further embodiment of the apparatus, when it is determined that the destination address is not included in the handshake spoofing bypass list, the apparatus is further caused to: determine whether an error message has been received from the remote proxy node; and if it is determined that the error message has been received from the remote proxy node, add the destination address to the handshake spoofing bypass list; and if it is determined that the error message has not been received from the remote proxy node, continue with the connection establishment in accordance with the respective handshake spoofing protocol for the connection establishment.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates the four abstraction layers of the TCP/IP model with respect to the seven abstraction layers of the OSI model;

DETAILED DESCRIPTION

Figure 2:
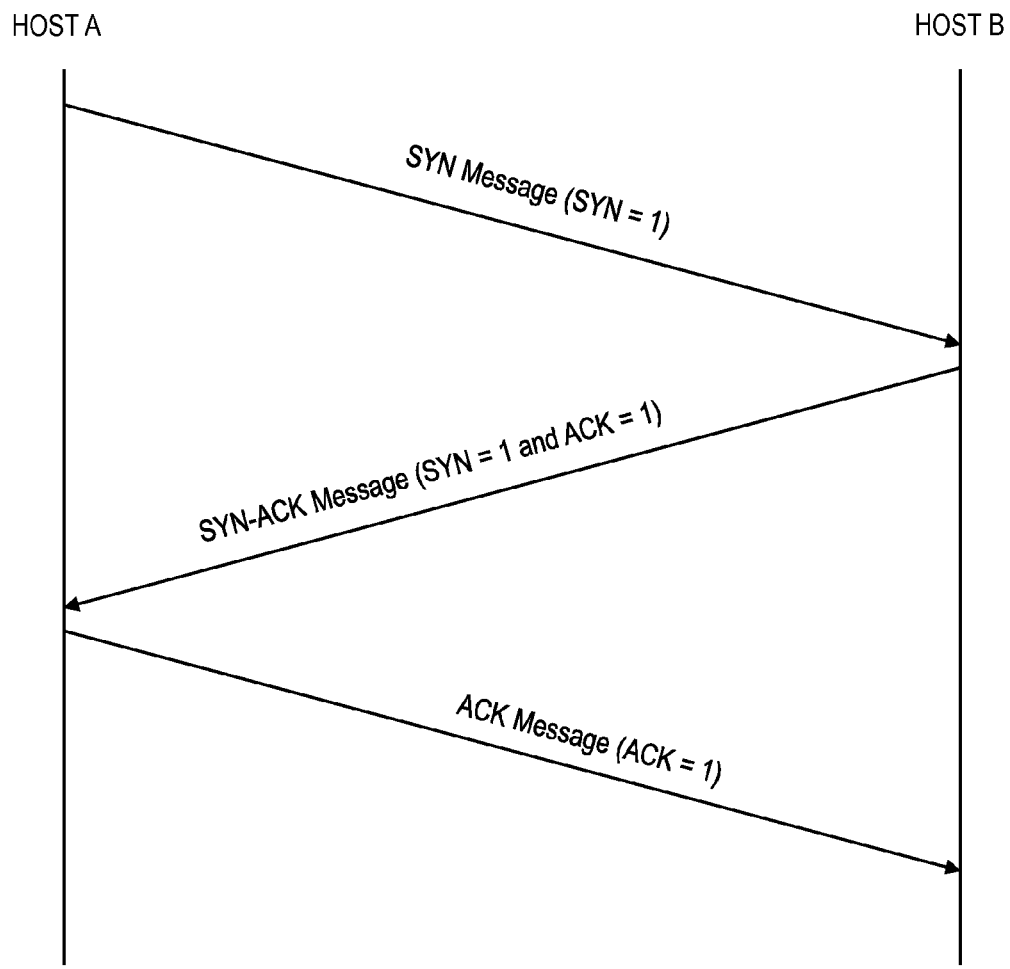
FIG. 2 illustrates a ladder diagram depicting the three-way handshake process for establishing a TCP/IP connection over an Internet Protocol (IP) based network.

An approach for selective dynamic disabling of transport layer handshake spoofing for connections where handshake spoofing would interfere with host-based fallback mechanisms and/or transport layer negotiations, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

As introduced above, in certain aspects of performance enhancing proxies (e.g., PEP handshake spoofing) the elimination of the multi-step handshake process involves spoofing of transport layer handshake messages to the client applications. In many networks (especially network environments that exhibit long transmission delay characteristics, such as satellite networks), a Performance Enhancing Proxy (PEP) may be employed to improve the performance of Internet protocols on network paths where native performance suffers due to characteristics (such as latency of a satellite network) of a link or sub-network on the path. Further, in many Internet and intranet applications that employ TCP as the transport layer protocol, the link characteristics of the environment limit the performance of TCP and other higher layer protocols. In such cases, PEP process may be employed at the transport layer (a Transport Layer PEP), where such Transport Layer PEPs typically let the application protocol operate end-to-end without modifying the application protocol in any way (e.g., a PEP implementation that interacts with TCP layer or a TCP PEP). For example, in an environment with a large bandwidth-delay product (e.g., a satellite network), a TCP PEP may be used to alter the behavior of the TCP connection by generating "local acknowledgments" to TCP data segments in order to improve the throughput of the respective connection.

More specifically, a reliable transport layer protocol (such as TCP) typically establishes a connection using a handshake process before entering the data transfer phase. Many transport layer PEPs eliminate the multi-step handshake process by spoofing the Transport Layer connection establishment phase (e.g., spoofing of handshake messages), which reduces the latency involved in connection establishment. For example, when a host wants to establish a transport layer connection, and initiates a transport layer handshake process, a local PEP endpoint intercepts the request message and sends an immediate local acknowledgement message to the initiating host. In other words, a TCP connection is intercepted by a proxy at the source host end of the network, and the source proxy terminates the connection as if it was the intended destination. Similarly, a proxy at the destination host end of the network, which terminates the connection between it and the end host—accordingly, a full TCP connection is established between the source host and the source-end proxy, and a full TCP connection is established between the destination host and the destination-end proxy. Over the communications path or link between the two proxies, however, a "spoofed" TCP connection is established, which eliminates the overhead of much of the handshaking over that path or link. The local PEP endpoint (proxy) thereby pretends to be the intended host server (the target server) at the remote end of the requested connection, and the remote PEP endpoint (proxy) pretends to be the intended host at the source end of the connection. The local PEP endpoint sends a spoofed connection establishment message to a remote PEP endpoint. The remote PEP endpoint then sends a transport layer handshake message to the target server. This process continues for all messages involved in the handshake process to establish the connection. This process can referred to as the transport layer handshake spoofing.

With PEP spoofing, however, the transport layer handshake spoofing may interfere with host-based fallback mechanisms such as Happy Eyeballs. In one scenario, IP address issues with the Internet/intranet server can arise when an Internet/intranet server is misconfigured or a DNS server provides an IP address for an Internet/intranet server that is not actually supported by the server. Several examples of this scenario are as follows:

(1) A rollout plan for IPv6 may place an IPv6 AAAA in the DNS response prior to deployment of the server/network support for IPv6. In other words, the DNS provides an IPv6 address (AAAA record) for a web server, and the web server is not yet configured to support IPv6. To date, this scenario has been observed with respect to a multitude of Internet web-servers (e.g., the scenario has been observed with respect to many government (.gov sites) websites).

(2) A Server/network may not be properly configured for IPv6 on all ports via which the server provides services. For example, an Internet server may be configured for IPv6 only for HTTP traffic but not HTTPS traffic. To date, this scenario has also been observed with respect to a multitude of Internet web-servers (e.g., the scenario has been observed with respect to many government (.gov sites) websites and education websites (.edu sites)).

(3) Sun-setting of IPv4 support on Internet/intranet servers results in a similar issue. In this scenario, while a DNS server may provide both IPv4 and IPv6 addresses, a respective web server may no longer support the IPv4.

In another scenario, an Internet/intranet path from an Internet service provider (ISP) or gateway may fail, which may occur due to ISP or gateway issues. For example, if IPv6 connectivity is faulty at the ISP or gateway, but the client is nonetheless provided an IPv6 address to access the Internet/intranet resource. In a further scenario, IP routing may fail at a location. An example of this scenario would be if a user site has an un-routable IP address (e.g., due to incorrect IP address setup or software bugs in the routers/switches etc.). For example, if IPv6 is set up incorrectly or the user site employs old router firmware such that an IPv6 address for the user site cannot route to/from the respective PEP device. Additionally, transport layer handshake spoofing may also interfere with negotiation of transport layer connection characteristics. For example, TCP handshake spoofing may result in the following between the client and the server: TCP MSS mismatch, TCP option mismatch and TCP extension header mismatch. Further, transport layer handshake spoofing may interfere with negotiation of transport layer connection characteristics. For example, TCP handshake spoofing may result in transport layer negotiation issues, such as TCP MSS mismatch, TCP option mismatch and TCP extension header mismatch. When such an error condition occurs on a transport connection, the connection has to be terminated.

By way of example, within the TCP protocol, maximum segment size (MSS) is a parameter of the options field of the TCP header that specifies the largest amount of data (e.g., specified in octets) that a computer or communications device can receive in a single TCP segment (not counting the TCP header or the IP header). The maximum segment size relates to the TCP/IP data segment (excluding TCP and IP headers), whereas the maximum transfer unit relates to the MSS plus the and the TCP and IP headers. Further, within the OSI Model, the TCP Header and Data is called a Segment (Layer 4), and the IP Header and the Segment is called an IP Datagram (Layer 3). The IP packet or datagram containing a TCP segment may be self-contained within a single packet, or it may be reconstructed from several fragmented pieces—either way, the MSS limit applies to the total amount of data contained in the final, reconstructed TCP segment. The MSS can generally be set as a TCP option via the TCP SYN packet during the initial TCP connection handshake process, and generally cannot be changed after the connection is established. The default TCP Maximum Segment Size is 536. To avoid fragmentation in the IP layer, a host specifies the MSS at a value equal to the largest IP datagram that the host can handle minus the IP and TCP headers. For example, IPv4 hosts must be able to handle an MSS of 536 octets (MSS=576−20−20) and IPv6 hosts must be able to handle an MSS of 1220 octets (MSS=1280−40−20). In that regard, for example, an MSS mismatch can occur where an IPv6 segment is received by an IPv4 host—the packet segment size will exceed the MSS of the host, and will thus be dropped.

With respect to a TCP option mismatch, an IPv4 datagram may include the selection of one or more TCP options, which are specified via a TCP options field within the TCP header. The TCP header options field may include up to three fields, comprising the Option-Kind field (1 byte), the Option-Length field (1 byte), and the Option-Data (variable length). For example, available TCP options include a maximum segment size option (to set the MSS to a value other than the default), a window scaling option, a selective acknowledgments option and no option (nop). The Maximum Segment Size (MSS) option is used to define the maximum segment that will be used during a connection between two hosts (discussed in further detail above). The MSS TCP Option occupies 4 bytes (32 bits) of length (one byte for the option-kind, one byte for the option field length and two bytes for the option-data specifying the MSS size). The Window Scaling option is used as an extension of the Window size flag—because the window size flag is 2 bytes (16 bits), the largest possible value of the Window size flag is only 65,535 bytes (64 kb). The window scaling option adds additional bits to for window sizing, which facilitates a scaling or increase of the TCP window size. The selective acknowledgments (SACK) option facilitates the selective acknowledgment of specific bytes. With this option, when segments arrive at the destination out of order, the receiver can selectively acknowledge the bytes that it has received. For example, if a client is waiting for byte 4,268, but the SACK option shows that the client has also received bytes 7,080 through 8,486, the source is able to recognize that the target is missing bytes 4,268 through 7,079—and thus can resend the missing 2,810 bytes, rather than restarting the entire transfer at byte number 4,268. The SACK field in the TCP options header uses two 16 bit fields, which allows the receiver to specify the range of bytes it has received (there are also instances where the SACK field can be expanded to two 24 or two 32 bit fields). Accordingly, circumstances may arise where there is a mismatch of TCP options as between the source host or proxy and the target host or proxy.

Further, with regard to extension header mismatch, in an IPv6 datagram, one or more extension headers may be included before the encapsulated payload, after the mandatory "main" header of the datagram. Only fields that are needed for special purposes are put into extension headers, included in the datagram when applicable. Further, the extension headers of the IPv6 protocol take the place of many of the predefined IPv4 options. More specifically, because IPv4 options perform a very important role in the IP protocol operation, the capability had to be preserved in IPv6. Due to the performance impact of IPv4 options, however, the IPv6 protocol removes the options functionality from the main header and instead implements them through a set of additional headers called extension headers. The main header thereby remains fixed in size (as opposed to being variable as in IPv4), while customized extension headers are added as needed. Accordingly, circumstances may arise where there is a mismatch between the intended options of a source host or proxy and the respective interpretation by the target host or proxy in the TCP connection establishment—for example, IPv6 options may be specified in extension headers, whereby, if the target proxy is not configured for IPv6, then the headers (the main and/or the extension headers) will not be interpreted properly.

Figure 3A:
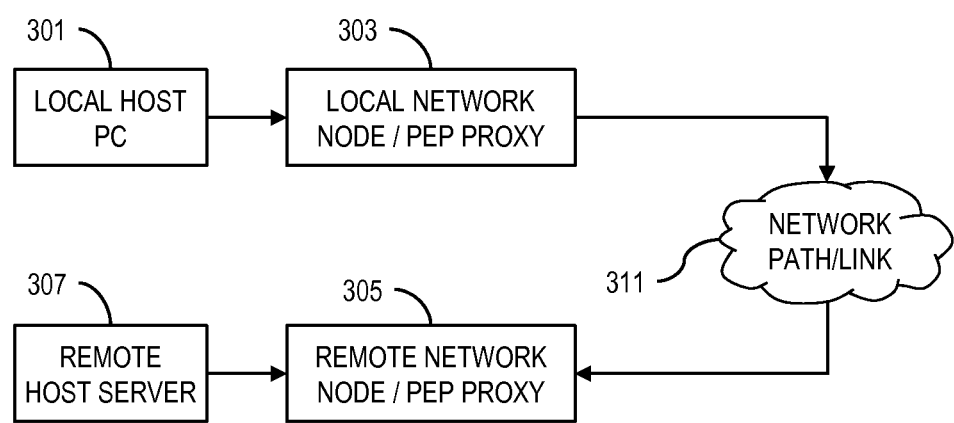
FIG. 3A illustrates a block diagram depicting a communications network for selective dynamic disabling of transport layer handshake spoofing, in accordance with example embodiments of the present invention.

According to example embodiments, therefore, the PEP device monitors for scenarios where handshake spoofing would interfere with host-based fallback mechanisms (e.g., fallback mechanisms from IPv6 to IPv4) and/or transport layer negotiations, and accordingly identifies the respective destination IP address to which the transport layer handshake spoofing should be dynamically bypassed or disabled to avoid such potential interference. FIG. 3A illustrates a block diagram depicting a communications network for selective dynamic disabling of transport layer handshake spoofing, in accordance with example embodiments of the present invention. With reference to FIG. 3A, a local PEP device or proxy 303 receives application messaging from a local host (e.g., a host PC) 301. The messaging relates to establishment of connections across the network 311 (e.g., connections for application data communications between the local host 301 and a remote server 307), and application session communications over the connection (e.g., for a web browsing session, where the local host 301 hosts a web browser application and the remote host 307 hosts one or more web-sites being accessed by the web browsing application). The connection across the network 311, for example, employs a performance enhancing proxy protocol that operates via the local network node (PEP proxy) 303 and the remote network node (PEP proxy) 305. By way of example, the local PEP proxy 303 maintains a list of IP addresses (e.g., a Handshake Spoofing Bypass List) for which multi-step handshake spoofing should be disabled. This PEP endpoint, from where accelerated or spoofed connections originate, also monitors for spoofed transport layer connections (e.g., TCP connections) where some sort of failure of the connection establishment occurs without any data received from the remote PEP endpoint, or where the connection is reset (or may have to be reset) because of transport layer negotiation issues. For each such failed spoofed transport layer connection, the local PEP endpoint device 303 adds the destination IP address to the Handshake Spoofing Bypass List (provided that the IP address is not already present in the list). The local PEP endpoint 303 then uses this list to dynamically disable handshake spoofing for all new/future spoofed connections to that destination IP address.

Figure 3B:
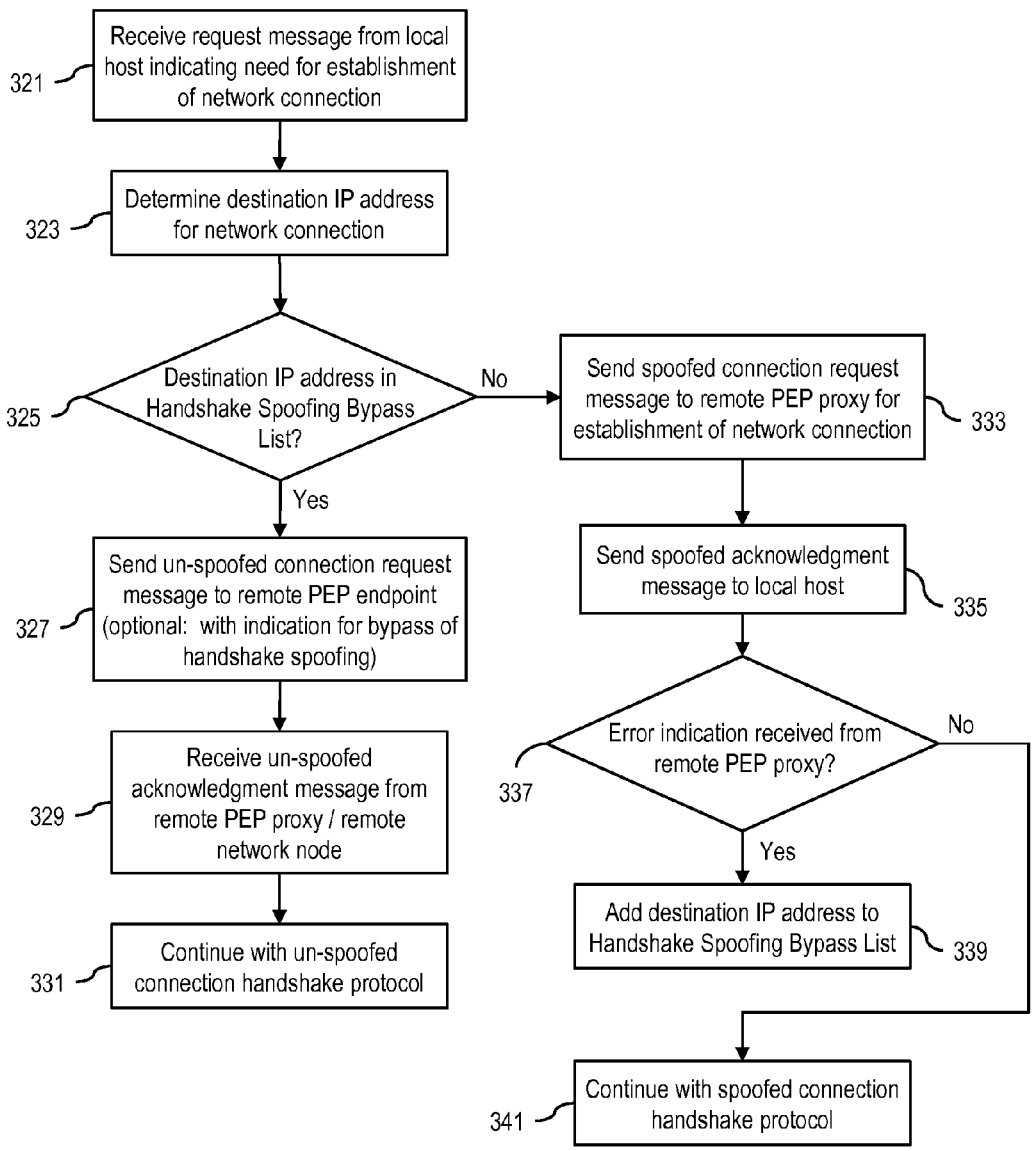
FIG. 3B illustrates a flow chart depicting an approach for selective dynamic disabling of transport layer handshake spoofing, in accordance with example embodiments of the present invention.

FIG. 3B illustrates a flow chart depicting an approach for selective dynamic disabling of transport layer handshake spoofing, in accordance with example embodiments of the present invention. With reference to FIG. 3B, the local PEP proxy 303 receives one or more messages from the local host 301 indicating the need for establishment of a network connection with the remote host 307 (Step 321). For example, the local PEP proxy receives a SYN message from the local host for establishment of a TCP network connection with the remote host. The local PEP proxy then determines the destination address (e.g., the destination IP address) (Step 323), and determines whether the destination address is in the Handshake Spoofing Bypass List maintained by the local PEP proxy (Step 325). If the local PEP proxy determines that the destination address is in the spoofing bypass list, then it sends a corresponding un-spoofed connection request message to the remote PEP proxy 305 (Step 327), and optionally indicating that the PEP handshake spoofing should be disabled for the establishment of the respective connection. For example, for a TCP connection, the local PEP proxy sends the SYN message the remote PEP proxy (as per the normal, un-spoofed TCP handshake protocol). In response, the local PEP proxy should receive a handshake response message from the remote PEP proxy (e.g., for a TCP connection, an un-spoofed SYN-ACK message)(Step 329), and would then continue with the un-spoofed connection establishment (Step 331), following the regular protocol handshake process. At the remote end, upon receipt of the connection request, the remote PEP proxy would communicate with the remote host server, also following the regular protocol handshake process. As such, because the destination address was included in the Handshake Spoofing Bypass List, the handshake spoofing is disabled for the connection, and the normal handshake protocol process is followed at both ends. This, however, does not mean that the connection does not employ acceleration, but rather that only the handshake spoofing is bypassed.

Alternatively, if (at Step 325) the local PEP proxy determines that the destination address is not included in the Handshake Spoofing Bypass List, then the local proxy proceeds with the spoofing of the handshake spoofing process. As such, the local PEP proxy sends a spoofed connection request to the remote PEP proxy (Step 333), and sends a spoofed acknowledgment message to the local host (Step 335)—the messaging is "spoofed" in that the acknowledgment message is sent directly to the local host by the local PEP proxy without first receiving an acknowledgment from the remote host. Upon receiving the request message, the remote PEP proxy issues a corresponding transport layer connection establishment message to the target or remote host server (as discussed above in described the methodology of such transport layer handshake spoofing processes). In the error case, the transport layer connection establishment message, sent by the remote PEP proxy to the target host server, however, may not trigger any response or may trigger an error response (e.g., due to any of the scenarios discussed above with respect to how transport layer handshake spoofing may interfere with host-based fallback mechanisms). In the event that no response or an error response is received, the remote PEP proxy issues an error message or a message for termination of the spoofed connection to the local PEP proxy. Now, in the event that the local PEP proxy receives the error or termination message (indicating that the connection establishment has failed) (Step 337), the local PEP proxy will add the destination address to the Handshake Spoofing Bypass List (Step 339). Accordingly, any subsequent PEP connection requests received by the local PEP proxy for that destination address will be determined as being on the spoofing bypass list, and the connection handshaking will not be spoofed. According to a further embodiment, the spoofed connection termination message may include additional relevant information, such as a reason-code indicating the reason for terminating the spoofed connection. Alternatively, if the local PEP proxy does not receive an error indication (at Step 337), then it will continue with the connection establishment (completing the spoofed handshaking process) (Step 341).

Accordingly, for each failed spoofed connection, the Local PEP endpoint device adds the destination IP address to the handshake spoofing bypass list (provided that the IP address is not already present in the list). The local PEP endpoint then utilizes this list to dynamically disable handshake spoofing for all new/future spoofed connections to that destination IP address. By way of example, the Local PEP endpoint checks if the destination IP address is present in the handshake spoofing bypass list whenever a new transport layer connection establishment request is received from the host. If the IP address is in the handshake spoofing bypass list, the Local PEP endpoint does not spoof the handshake messages, and thus, when the IP address is in the list, all subsequent spoofed connections to that destination IP address will have transport layer handshake spoofing disabled. According to a further example embodiment, the entries in the handshake spoofing bypass list would be limited to a reasonable upper bound of entries (e.g., the maximum length of the list would be limited to a preconfigured or configurable number entries).

According to further example embodiments, under certain conditions, the local PEP endpoint may remove an address from the handshake spoofing bypass list. By way of example, if a spoofed connection to an IP address is successfully established, data transfers are successfully transmitted over the connection, and the connection is terminated in a normal manner (e.g., without any errors related to transport layer negotiations), the local PEP endpoint checks if the destination IP address is present in the handshake spoofing bypass list. If the IP address is present in the list, then the local PEP endpoint removes the entry based on the successful spoofing. The successful data transfer indicates the validity of the IP address, and thus the local PEP endpoint can perform handshake spoofing for future connections to that server (IP address). By way of further example, when a new IP address entry is to be added to the handshake spoofing bypass list, where the new entry would exceed a maximum list limit, then the local PEP endpoint may remove an older entry from the list. According to one embodiment, when a new entry that is to be added to list would exceed the configured maximum limit, the Local PEP endpoint replaces the least recently used (LRU) entry from the list with the new entry so as to remove entries based on a use frequency. According to an alternate embodiment, the entries may be replaced in a first-in first-out manner to remove the oldest entries first.

Such embodiments of the present invention for selective dynamic disabling handshake spoofing ensures that handshake spoofing does not interfere with host-based fallback mechanisms such as Happy Eyeballs or transport layer negotiations. Additionally, such embodiments also ensure that the advantages of PEP handshake spoofing is utilized for the spoofed connections which do not exhibit Internet and/or intranet connectivity issues. According to further embodiments, the entries in the handshake spoofing bypass list may be persisted across local PEP endpoint reboots, whereby a local terminal device may periodically write the content of the list to a file, thereby achieving further enhancements in performance and user experience.

Figure 4:
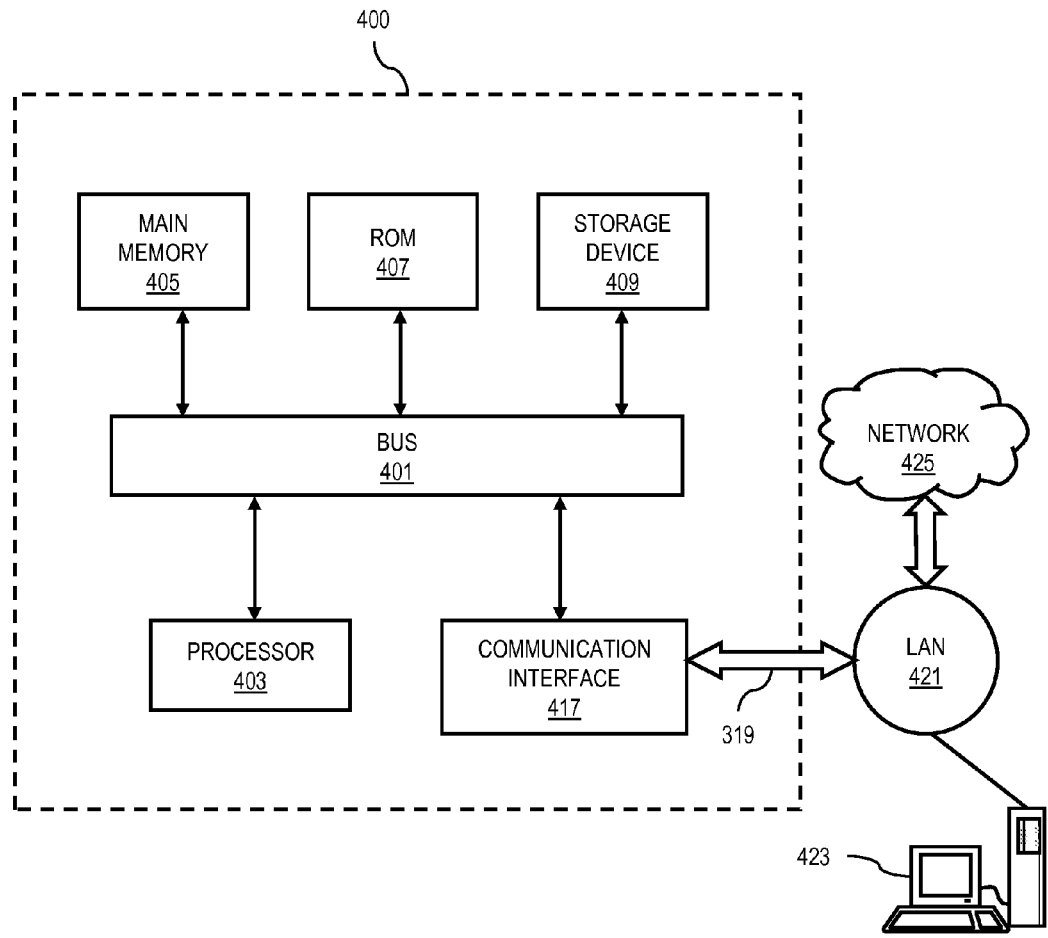
FIG. 4 illustrates a computer system upon which exemplary embodiments according to the present invention can be implemented.

FIG. 4 illustrates a computer system upon which exemplary embodiments according to the present invention can be implemented. The computer system 400 includes a bus 401 or other communication mechanism for communicating information, and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions to be executed by the processor 403. The computer system 400 further includes a read only memory (ROM) 407 or other static storage device coupled to the bus 401 for storing static information and instructions for the processor 403. A storage device 409, such as a magnetic disk or optical disk, is additionally coupled to the bus 401 for storing information and instructions.

According to one embodiment of the invention, dynamic and flexible approaches for selective dynamic disabling of transport layer handshake spoofing, are provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hardwired circuitry is used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, or a telephone modem to provide a data communication connection to a corresponding type of telephone line. As another example, communication interface 417 may be a local area network (LAN) card (e.g. for Ethernet™ or an Asynchronous Transfer Mode (ATM) network) to provide a data communication connection to a compatible LAN. Wireless links can also be implemented. Further, the communication interface 417, for example, includes peripheral interface devices, such as a Universal Serial Bus (USB) interface, a PCMCIA (Personal Computer Memory Card International Association) interface, etc.

The network link 419 typically provides data communication through one or more networks to other data devices. For example, the network link 419 provides a connection through local network 421 to a host computer 423, which has connectivity to a network 425 (e.g. a wide area network (WAN) or the global packet data communication network now commonly referred to as the "Internet") or to data equipment operated by service provider. The computer system 400 sends messages and receives data, including program code, through the network(s), network link 419, and communication interface 417. In the Internet example, a server (not shown) might transmit requested code belonging to an application program for implementing an embodiment of the present invention through the network 425, local network 421 and communication interface 417. The processor 403 executes the transmitted code while being received and/or store the code in storage device, or other non-volatile storage for later execution.

The term "computer-readable medium" as used herein refers to any medium that participates in providing instructions to the processor 403 for execution. Such a medium may take many forms, including but not limited to non-volatile media, volatile media, and transmission media. Non-volatile media include, for example, optical or magnetic disks, such as storage device 409. Volatile media may include dynamic memory, such as main memory 405. Transmission media may include coaxial cables, copper wire and fiber optics, including the wires that comprise bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components.

While exemplary embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention. The specification and drawings are accordingly to be regarded in an illustrative rather than restrictive sense.

What is claimed is:

1. A method comprising:
   receiving, by a local proxy node of a communications network, a request message from a respective local host for establishing a network connection with a remote host;
   determining a destination address for the network connection;
   determining whether the destination address is included in a handshake spoofing bypass list; and
   if it is determined that the destination address is included in the handshake spoofing bypass list, transmitting a corresponding un-spoofed connection request message to a remote proxy node associated with the remote host, in accordance with a respective handshaking protocol for the connection establishment; and if it is determined that the destination address is not included in the handshake spoofing bypass list, transmitting a corresponding spoofed connection request message to the remote proxy node associated with the remote host, in accordance with a respective handshake spoofing protocol for the connection establishment.

2. The method according to claim 1, further comprising: when it is determined that the destination address is not included in the handshake spoofing bypass list, in addition to the transmission of the corresponding spoofed connection request message to the remote proxy node, transmitting a corresponding acknowledgment message to the local host, in accordance with the respective handshake spoofing protocol for the connection establishment.

3. The method according to claim 1, when it is determined that the destination address is not included in the handshake spoofing bypass list, the method further comprises:

determining whether an error message has been received from the remote proxy node; and if it is determined that the error message has been received from the remote proxy node, adding the destination address to the handshake spoofing bypass list; and if it is determined that the error message has not been received from the remote proxy node, continuing with the connection establishment in accordance with the respective handshake spoofing protocol for the connection establishment.

4. The method according to claim 1, wherein the connection comprises a transmission control protocol (TCP) connection, and the handshake spoofing protocol comprises eliminating multi-step handshake messaging over a network path between the local proxy node and the remote proxy node by generating local acknowledgments to spoof handshake messages to respective client applications.

5. An apparatus, comprising:

at least one processor; and at least one memory including computer program code for one or more programs, the at least one memory and the computer program code configured to, with the at least one processor, cause the apparatus to perform at least the following, receive a request message from a respective local host for establishing a network connection with a remote host;

determine a destination address for the network connection;

determine whether the destination address is included in a handshake spoofing bypass list; and if it is determined that the destination address is included in the handshake spoofing bypass list, transmit a corresponding un-spoofed connection request message to a remote proxy node associated with the remote host, in accordance with a respective handshaking protocol for the connection establishment; and if it is determined that the destination address is not included in the handshake spoofing bypass list, transmit a corresponding spoofed connection request message to the remote proxy node associated with the remote host, in accordance with a respective handshake spoofing protocol for the connection establishment.

6. The apparatus according to claim 5, wherein the apparatus is further caused to:

when it is determined that the destination address is not included in the handshake spoofing bypass list, in addition to the transmission of the corresponding spoofed connection request message to the remote proxy node, transmit a corresponding acknowledgment message to the local host, in accordance with the respective handshake spoofing protocol for the connection establishment.

7. The apparatus according to claim 5, wherein, when it is determined that the destination address is not included in the handshake spoofing bypass list, the apparatus is further caused to:

determine whether an error message has been received from the remote proxy node; and if it is determined that the error message has been received from the remote proxy node, add the destination address to the handshake spoofing bypass list; and if it is determined that the error message has not been received from the remote proxy node, continue with the connection establishment in accordance with the respective handshake spoofing protocol for the connection establishment.

8. The apparatus according to claim 5, wherein the connection comprises a transmission control protocol (TCP) connection, and the handshake spoofing protocol comprises eliminating multi-step handshake messaging over a network path between the local proxy node and the remote proxy node by generating local acknowledgments to spoof handshake messages to respective client applications.

* * * * *